United States Patent [19]
Volk

[11] 3,759,103
[45] Sept. 18, 1973

[54] DISPOSABLE COOKING THERMOMETER

[76] Inventor: Anthony J. Volk, 173 E. Syracuse St., Turlock, Calif.

[22] Filed: Mar. 1, 1971

[21] Appl. No.: 122,604

[52] U.S. Cl.............. 73/358, 99/192 TT, 116/114.5
[51] Int. Cl. ............................................ G01k 11/08
[58] Field of Search................... 73/358; 116/114.5; 99/192 TT; 337/408, 409; 340/219

[56] References Cited
UNITED STATES PATENTS
3,090,235  5/1963  Houser.................................. 73/358
3,548,780  12/1970  Kliewer................................ 73/358

Primary Examiner—Richard C. Queisser
Assistant Examiner—Denis E. Corr
Attorney—Gregg, Hendricson & Caplan

[57] ABSTRACT

A thermometer including a rod movable axially of a tube having a closed tip end with a thermally plastic material disposed in the bore in the tip end of the tube and a spring compressed in the tube about the rod and urging the rod into the tube. The rod extends from the rear end of the tube as an indicator and as the thermally plastic material softens with increasing temperature, the rod is forced by the spring into the bore to squeeze material past the rod.

5 Claims, 7 Drawing Figures

Patented Sept. 18, 1973
3,759,103
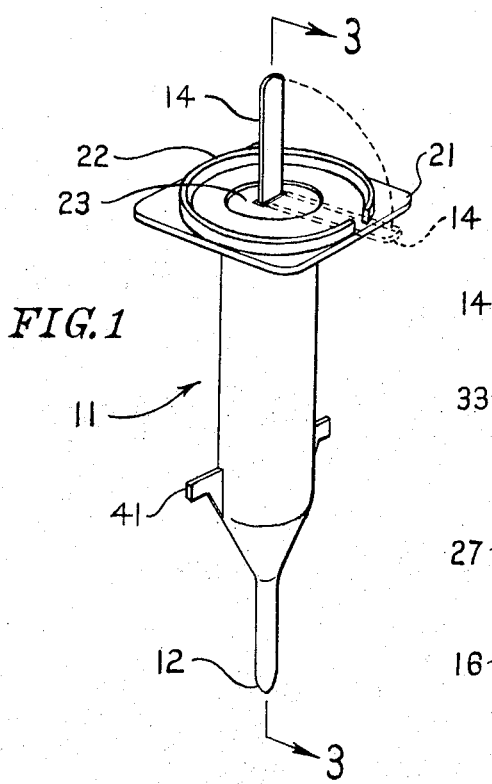
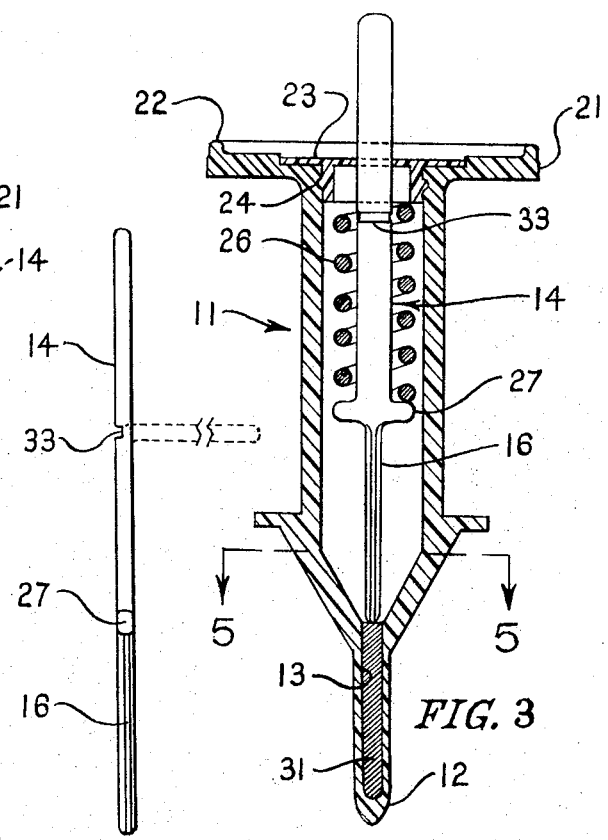
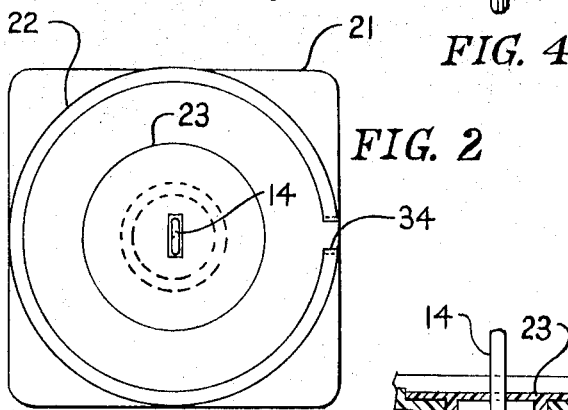
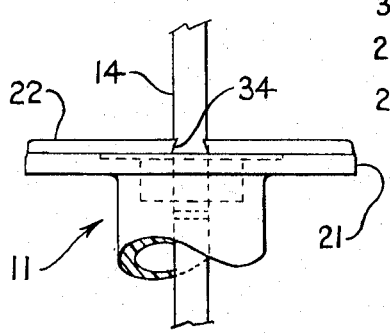
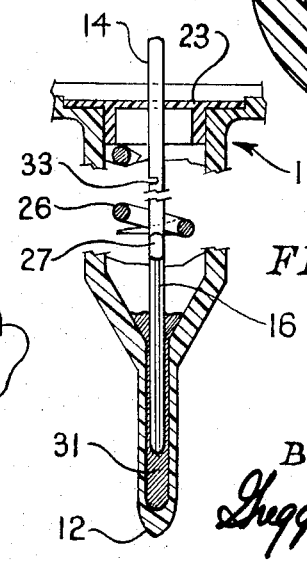
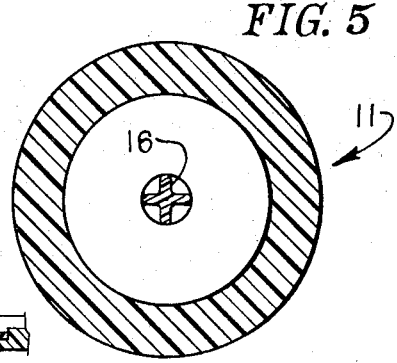
INVENTOR.
ANTHONY J. VOLK
BY
Gregg, Henducson & Caplan
ATTORNEYS

DISPOSABLE COOKING THERMOMETER

BACKGROUND OF INVENTION

The present invention is directed to the provision of a highly reliable and inexpensive temperature indicator for use in the cooking of foods. The thermometer hereof is adapted for insertion in items of food such as poultry, meat and the like, prior to distribution and sale, to provide the housewife or others with a positive indication of the internal temperature thereof during cooking. This general field of endeavor has been explored by others and various patents have issued upon devices for this general purpose. In this respect attention is invited, for example, to U.S. Pat. No. 3,140,611 incorporating a fusable latch holding an indicating rod or the like within the device against spring pressure until a predetermined temperature fuses the latch to release the indicator.

The present invention provides a simple and inexpensive temperature indicator for cooking wherein a continuous indication of temperature is provided, in distinction to suddenly releasable devices. Structurally the present invention includes an elongated hollow tube having a closed tip end with an axial bore extending from the interior of the tube into the tip. An indicator rod is disposed in the tube in extension from the open tube end with an axial extension of the rod fitting the bore to slide therein. A thermally plastic material is disposed in the bore with such material having predetermined properties to progressively soften at predetermined temperatures but being a solid at room temperature. Resilient means within the tube urge the indicator rod inwardly of the tube.

The indicating means or rod of the present invention is, in fact, a thin, elongated plate of limitedly flexible material with a notch disposed a predetermined distance from the outer end of the plate. This plate extends from the tube through an opening in a closure member across the rear tube end and the plate is adapted to be flexibly bent over at 90° to the axis of the tube and there to engage a notched portion in the tube end or tube end closure for retention of the indicator plate in such position prior to actuation of the device for use. In this above-noted position the indicator plate or rod is drawn slightly away from the above-noted thermally plastic material so as to further compress the spring in the tube. Unlatching or cocking of the device for use is accomplished by lifting the outer end of the flexible plate from the retaining notch so that the spring then moves the rod slightly further into the tube for engagement of the small rod end extension with the material in the bore and at the same time straightening the outer end of the rod or plate so that it extends axially from the rear end of the tube.

With the device of the present invention inserted in poultry, meat or the like, being cooked, the thermally plastic material will commence to soften at a predetermined temperature so that the rod in the tube is forced further into the tube by the spring pressure to thus squeeze the softened material out of the bore alongside of the inner rod end as it enters the bore. Progressively increasing temperatures further soften this thermally plastic material so that the rod further enters the tube and thus the outer indicating portion of the rod is drawn slowly into the tube as the temperature of the tube tip increases. It will consequently be seen that the present invention provides a continuous indication of temperature variations and, of course, the indicator hereof may be appropriately marked, colored, or the like, to identify the approach of or the attainment of particular cooking conditions.

DESCRIPTION OF FIGURES

The present invention is illustrated in the accompanying drawing wherein:

FIG. 1 is a perspective view of a preferred embodiment of the present invention;

FIG. 2 is a top plan view of the device of FIG. 1;

FIG. 3 is a central longitudinal section taken in the plane 3—3 of FIG. 1;

FIG. 4 is a front elevational view of the indicator rod of the invention as illustrated in FIG. 2;

FIG. 5 is a transverse section taken in the plane 4—4 of FIG. 3;

FIG. 6 is a partial elevational view of the upper portion of the device of FIG. 1; and FIG. 7 is a partial longitudinal sectional view of the device of FIG. 1 in an intermediate stage of temperature indication.

DESCRIPTION OF PREFERRED EMBODIMENT

Considering now a preferred embodiment of the present invention and referring to the Figures of the drawing, it will be seen that the device hereof is provided as a small elongated tube element which may have a circular, oval or even rectangular cross section. The tube tapers inwardly at the forward end thereof to a small cylindrical axial extension or tip 12 which is closed at the outer end thereof. Within this tip 12 there is provided a small axial bore 13 communicating with the interior of the tube.

Within the tube there is provided an indicator rod 14 having the form of a thin flat elongated plate, as shown. The rod 14 is provided with a forward axial extension 16 which may have a cross section such as illustrated in FIG. 4 and 5, i.e., a plurality of longitudinal grooves along same. The rod extension 16 is dimensioned to fit a bore 13 in the tube so as to be slidable into the bore.

At the rear end of the device the tube 11 is provided with an exterior flange 21 with a circular upstanding ridge 22 thereon extending rearwardly from the device. A flanged collar 23 fits in the open end of the tube and may be provided with an annular ridge or spaced radial projections thereabout snapping into an annular groove in the end of the tube, as indicated at 24, for locking the collar into position.

A spring 26 is disposed within the tube in compression between the inner end of the collar 23 and lateral projections 27 on the rod 14. Thus the rod is urged inwardly of the tube. The bore 13 in the tip of the tube is filled or substantially filled with a material 31 that becomes plastic or liquid at a predetermined temperature. This material may, for example, be comprised as Cerro metal or any of a variety of metal alloys including, for example, woods metal, bismuth, tin and the like. It will be appreciated that it is well known in the art to compound metal alloys, for example, to achieve a desired melting or fusing temperature thereof. The melting temperature of the material 31 is chosen as the temperature at which the interior of poultry, meat or the like, containing the present invention is considered to be fully cooked. Thus, in the case of a hen turkey, the material 31 is compounded to have a melting temperature of 172° F.

There is additionally provided as a portion of the present invention means for folding the extended portion of the indicator rod out of the way. For many applications of the present invention it is at least inconvenient to have the indicator rod extending from the poultry, meat or the like, in which it is inserted prior to sale. Particularly in the instance of frozen foods, for example, it is conventional to apply a covering envelope of some type over the food for sale and this generally requires that the exterior configuration be relatively smooth. Thus the rod 14 is actually formed as a thin, flat, elongated plate extending through the central slot in the collar 23 and including a short portion of substantial flexibility. This portion may be provided by a cut-out 33 reducing the wide dimension of the plate at a predetermined distance from the outer end of the plate. The rod or plate 14 is formed of a resiliently flexible material such as, for example, nylon, and in fact the tube and collar of the present invention may also be formed of this same material. The rod may thus be bent at the location of the cut-out 33 and a catch is provided to releasably retain the rod in bent position. There is provided in the ridge 22 about the tube flange 21 an undercut radial slot 34 disposed in alignment with a flat side of the plate 14 of the indicator rod. The cut-out 33 is so located that with the inner axial extension 16 of the rod engaging the material 31 in the tube, the cut-out is disposed slightly below the upper surface of the collar 23. Thus, in order to readily fold over the outer end of the indicator, it is necessary to pull the indicator slightly out of the tube against the force of the spring 26. In this position the rod or plate may be bent over 90° so as to snap into the transverse slot 34 forming the catch. The rod is thus held in this position. At such time as the device of the present invention is to be used, it is only necessary to lift the folded end of the rod slightly to snap it out of the slot 34 and the spring 26 will then pull the rod downwardly into the tube to pivot the outer end of the rod outwardly into axial alignment with the remainder of the rod. It will be appreciated that a slot 34 may be formed in each side of the ridge 22 on the tube flange 21 so that the indicator end may be folded either to right or left for retention in storage position. The small distance provided between the rod extension 16 in the tube bore 13 when the rod is bent over in storage position ensures that the rod will be slightly drawn into the tube when the outer end thereof is released from storage position to thus assure that the entire indicator is axially aligned with the tube.

Considering now use of the present invention and manner of operation thereof, it is noted that the device is assembled with the appropriate material 31 in the bore 13 and the tube 11 is then forced into the meat, poultry, or the like, whose cooking is to be identified or indicated by the invention. In the instance of turkeys, for example, the thermometer is inserted in the deepest or thickest part of the breast as this would normally be the last portion of the turkey to be completely cooked during the cooking operation. There may be provided small fins 41 on the exterior of the housing, as shown, with such fins being wider toward the rear of the housing to act somewhat like hooks holding the thermometer in the raw meat or poultry. With the thermometer properly inserted in the poultry, meat or the like, the indicator 14 is pulled slightly outwardly of the tube and folded over at 90° to snap into a slot 34. In this position the indicator is retained so as to maintain the indicator out of the way for packaging, storage and handling of the food. At such time as cooking is to be commenced and the present invention is to be employed, the outer end of the indicator 14 is moved upwardly as by finger pressure to release it form the undercut slot 34 so that the spring 26 compressed about the indicator in the tube will draw the indicator rod 14 further into the tube until the axial forward extension 16 of the rod engages the surface of the material 31 in the tube bore 13. As the temperature of the tip end 12 of the tube rises and approaches the melting temperature of the material 31, there will result a certain softening of this material. The end of the rod extension 16 is forced against the material 31 by the spring 26 and consequently as this material 31 softens the rod will be driven into the bore 13. With the rod fitting relatively closely in the bore, there will then result a squeezing of the now at least partially plastic material 31 up out of the bore past the rod extension 16. As noted above, longitudinal grooves may be formed along the rod extension 16 to facilitate control over the rod positioning during squeezing of material from the tube bore 13. As the temperature of the tube tip 12 continues to rise, the material 31 softens further and the rod is thus forced further into the bore. As the rod moves, the amount of rod extending from the back end of the tube decreases as an indication of the increasing temperature of the tube tip. The rod may, for example, be dimensioned so that the desired final temperature at which the food is completely cooked is indicated by disappearance of the rod, i.e., the outer end of the rod becoming flush with the flange 21 at the end of the tube. There may, of course, as noted above, be provided marks or possibly different colored areas on the indicator rod 14 so as to warn of approaching completion of cooking, for example.

The material 31 which softens with increasing temperature as the active element of the present invention will be seen to be forced upwardly into the main body of the tube 11 as the indicator rod moves into the tube. Normally the food, such as poultry, meat or the like, in which the present invention is inserted, is disposed so that the temperature indicator of the present invention is relatively upright for ready reading of the indicator hereof. Thus the molten material 31 remains in the bottom of the tube after it is forced or squeezed upwardly from the tip bore. Even if the thermometer hereof is inverted, it is found that the molten material remains in the tube generally clinging to the spring 26 therein. There may, however, if desired, be provided a gasket about the indicator rod at the rear end of the tube to provide added insurance for preventing the molten material 31 from leaving the tube under any and all circumstances.

It will be appreciated that there is presented by the present invention an improvement in disposable thermometer for cooking. A very simple and inexpensive device is provided hereby so as to, in fact, be truly disposable and yet the device is highly reliable and provides a continuous indication of temperature variation rather than merely a single abrupt indication of a particular temperature of the tip of the device. It is not intended to limit the present invention to the precise details of illustration and description for it will be understood by those skilled in the art that numerous variations and modifications of the invention may be made within the scope thereof.

What is claimed is:

1. A disposable cooking thermometer comprising:
   an elongated hollow housing having a closed tip end of reduced cross section and defining an internal longitudinal cavity with a small axial bore extending into the tip end of the housing from the cavity of said housing,
   a normally solid thermally plastic material disposed in said bore and softening at a predetermined temperature,
   an indicating rod slidably disposed in said housing and having a longitudinally extending portion slidably engaging said bore with a predetermined small clearance and contacting said material therein,
   said indicating rod normally extending from said housing and being formed of a resiliently flexible material at least at the housing end opposite the tip whereby the outer rod end may be bent at a right angle to the rod axis,
   catch means at the housing end opposite the housing tip and releasably retaining the outer rod portion in said bent condition, and
   resilient means within said housing urging said rod into said housing when said catch means is released from said outer rod portion so that said rod moves into said housing as said material softens at elevated temperature.

2. The thermometer of claim 1 further defined by said rod extension having at least one groove extending longitudinally thereof along which said material is squeezed as said rod extension moves into said bore.

3. The thermometer of claim 1 further defined by a short portion of the rod having a greater flexibility than the remainder and located slightly inside the housing end opposite the tip when the rod extension engages the solid material in said cavity whereby said rod is readily bent at right angles at said short rod portion by slightly withdrawing the rod from the housing against the resistance of said resilient means in the housing, and release of the bent rod portion by said catch means results in drawing the rod back into the housing sufficiently to straighten the rod.

4. A disposable cooking thermometer comrpsing:
   a tubular housing tapering to a tip at a closed front end and open at the rear end, said housing defining a central housing chamber open at said rear end and a small axial bore of predetermined cross section extending into said tip from the housing chamber,
   a thermally plastic material that is normally solid and softens at a predetermined elevated temperature disposed in said bore and filling same to a predetermined depth,
   an indicator rod slidably disposed in said housing and having a forward axial extension dimensioned to slidably enter said bore with at least one groove extending longitudinally thereof, said rod having a length to extend from the rear of the housing a predetermined distance with the end of the extension engaging the solid material in said bore,
   means closing the rear of the housing about said rod and slidably engaging the rod, and
   a spring disposed about said rod in said housing and compressed between the means closing said housing and a protuberance on said rod for urging said rod into said housing
   whereby said rod moves into said housing as said material softens at elevated tmeperatures and the rod extension squeezes material along said groove as an indication of the tip temperature.

5. The thermometer of claim 4 further defined by said rod having a flexible portion spaced from the outer end thereof for disposition slightly within the housing with the rod extension touching the solid material in said bore, whereby the rod is bendable ninety degrees when the rod is slightly withdrawn from the housing against spring pressure, and means releasably retaining the rod end in bent condition normal to the housing axis for maintaining the rod in stored condition.

* * * * *